(12) United States Patent  
Loughnane (10) Patent No.: US 6,279,511 B1
(45) Date of Patent: Aug. 28, 2001

(54) POWERED MULTICHANNEL INFUSION AND MONITORING SYSTEM

(75) Inventor: Michael H. Loughnane, Lafayette Hill, PA (US)

(73) Assignee: Instech Laboratories, Inc., Plymouth Meeting, PA (US)

( * ) Notice: Subject to any disclaimer, the term of this patent is extended or adjusted under 35 U.S.C. 154(b) by 0 days.

(21) Appl. No.: 09/425,683

(22) Filed: Oct. 22, 1999

Related U.S. Application Data

(60) Provisional application No. 60/105,438, filed on Oct. 23, 1998.

(51) Int. Cl.$^7$ ................................ A01K 1/04; A01K 1/06
(52) U.S. Cl. ............................................ 119/769; 119/421
(58) Field of Search .................................. 119/421, 769, 119/780, 787, 797

(56) References Cited

U.S. PATENT DOCUMENTS

| | | | |
|---|---|---|---|
| 5,213,063 | * 5/1993 | Franck, III | 119/797 |
| 5,305,712 | 4/1994 | Goldstein | 119/784 |
| 5,586,413 | 12/1996 | Sharon | 47/67 |
| 5,816,256 | * 10/1998 | Kissinger et al. | 119/421 X |
| 5,832,878 | * 11/1998 | Bonsall et al. | 119/769 |

* cited by examiner

Primary Examiner—Robert P. Swiatek
(74) Attorney, Agent, or Firm—Foley & Lardner (57) ABSTRACT

A method and system for infusing and monitoring a tethered laboratory animal includes a platform suitable for carrying the laboratory animal. A tether assembly includes a flexible conduit for connecting to the animal and a tether for tethering the animal. A torque sensor detects a motion of the animal and drives the tether assembly in response to the detected motion of the animal, and thereby reduces the torque on the animal. The platform is driven in a direction opposite to the tether assembly so that it appears to be stationary when the tether assembly is driven in response to a detected motion of the animal.

17 Claims, 7 Drawing Sheets

POWERED MULTICHANNEL INFUSION AND MONITORING SYSTEM

RELATED APPLICATION

This application claims the benefit of priority to U.S. provisional application Ser. No. 60/105,438 filed on Oct. 23, 1998, titled "Powered Multichannel Infusion and Monitoring System."

BACKGROUND OF THE INVENTION

1. Field of the Invention

This invention relates generally to the field of laboratory devices for infusing and monitoring small animals. More particularly, the invention concerns a laboratory device for passing multiple channels, without any form of commutation, to a tethered animal in a stationary environment, the device being responsive to a motion of the animal to reduce torque on the animal.

2. Background of the Related Art

Physiological studies often require externalization and attachment of implanted fluid filled catheters and/or electrical lines. Initially, to prevent tangling of these lines, an awake animal experiment required rotational restraint of the animal. To achieve a more normal, stress free environment, fluid and electrical swivels were developed that allowed a singly housed animal to move freely about the cage and line tangling was prevented by virtue of the swivels. The animal provides the requisite torque to rotate such devices.

While prior art electrical swivels have been built with a large number of electrical lines that a small animal is capable of turning, this has not been the case with fluid swivels. Small animals, such as rats, have difficulty turning a swivel with more than two fluid channels due to the build up of seal torques. Applications, such as brain microdialysis, require two channels per microdialysis probe. Therefore, to use two or more probes requires four or more channels. Not only does the rotational torque become excessive, it is difficult to achieve the low dead volume requirement on all channels. Electrical swivels have been combined with fluid swivels but the practical limit at the present time remains at two fluid lines with rats and one with mice.

These problems are further aggravated when two or more fluid channels are provided in a swivel. Increasing the number of channels increases the probability of the swivel leaking or having a higher torque. Furthermore, there is an inverse relationship between torque and leakage. A solution to reduce leakage is to use a stronger seal but this also comes at the price of a higher torque.

Where the total torque requirement exceeds an animals ability, a solution has been attempted that allows the floor of the circular cage to rotate freely. Hence, as the animal attempts to turn, the floor moves instead. A powered version of this type of device is commercially available through Bioanalytical Systems, Inc. While this prevents tangling of lines, it provides abnormal sensory input to the animal and evokes treadmill type behavior.

Other systems employ a rotating platform above the cage containing the animal. The rotating platform contains the necessary equipment such as fluids, pumps, amplifiers and other electronic circuitry. This large mass must be rotated with the animal and significantly impairs the dynamic response of the system. Furthermore, connection to large devices is generally impossible without commutation.

One such device is disclosed in U.S. Pat. No. 5,305,712 ("Goldstein") which discloses a tether system for an animal. The disclosed tether system includes an area for the animal and a "structure" above the area with an anchor for preventing the entanglement of the fluid or power providing means as the animal moves about in a cage.

Therefore, there is a need for a device that would allow experimenters to run multiple lines or channels to an animal including electrical, fluid, optical lines, and any combinations thereof. The device needs to provide a normal sensory environment for the animal that does not impose excessive torque when the animal wishes to turn. The elimination of commutation would obviate any possible leaks in fluid lines and eliminate noise due to sliding contacts and permit optical fibers to be used. As studies involving genetically diverse mice become more prevalent, the ability to attach multiple lines to awake mice would be even more desirable

SUMMARY OF THE INVENTION

Therefore, it is a general object of the invention to alleviate the problems and shortcomings identified above. More generally, an object of the invention is to provide a device that eliminates the need for any commutation in the lines to an animal and allow for line of different types, including fluid, electrical, and optical.

Another one of the objects of the invention is to provide a power assist mechanism that rotates a tether assembly to follow the rotation of an animal and thereby reduce the torque on the animal.

A further object of the invention is to use the infusion device on a small animal such as a mouse.

One of the objects of the invention is to provide a method for tethering and infusing an animal on a platform so that the tether assembly provides multiple infusion channels to the animal and responds to a motion of the animal to reduce the torque on the animal.

Another one of the objects of the invention is provide a tether and infusion system for an animal in which the tether system responds to a motion of the animal to reduce the torque on the animal.

A further object of the invention is to provide a method for tethering and infusing an animal on a platform in such a manner that the infusion channels passing through the tether system do not get entangled.

A further object of the invention is to provide a tether and infusion system for an animal on a platform in such a manner that the infusion channels passed through the tether system do not become entangled.

Yet another object of the invention is to provide a method for tethering and infusing an animal with multiple channels in which the animal is housed in a stationary cage to provide a stationary environment.

A further object of the invention is to provide a tether and infusion system in which an animal is provided a stable sensory environment by housing the animal in a stationary cage.

These and other objects are achieved by providing a method for tethering and infusing an animal, on a rotatable platform, by a tether and infusion device, comprising the steps of: (i) connecting a flexible conduit containing a plurality of infusion channels to the animal; (ii) providing a torque or motion sensor to detect a motion of the animal; and (iii) driving the flexible conduit, in response to the detected motion, to reduce the torque on the animal.

The present invention also provides a tether and infusion system for a laboratory animal comprising: (i) a platform suitable for carrying the laboratory animal; (ii) a tether assembly, including a flexible conduit comprising a plurality of channels, for tethering the animal; (iii) a torque sensor, connected to tether assembly, for detecting a motion of the animal; (iv) a drive means that drives the tether assembly in response to a detected motion of the animal, thereby reducing the torque on the animal.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DESCRIPTION OF THE PREFERRED EMBODIMENT(S)

The present invention provides, in a general aspect, a method for tethering and infusing an animal on a platform, comprising the steps of: connecting a flexible conduit comprising a plurality of infusion channels to the animal; providing a torque or motion sensor to detect a motion of the animal; and driving the flexible conduit, in response to the detected motion, to reduce the torque on the animal.

In another general aspect, the present invention provides a tether and infusion system for a laboratory animal comprising: a platform suitable for carrying the laboratory animal; tether assembly, including a flexible conduit containing a plurality of infusion channels, for tethering the animal; a torque sensor for detecting a motion of the animal; and a drive means that drives the flexible conduit in response to a detected motion of the animal, thereby reducing the torque on the animal.

In a preferred embodiment, the present invention provides a means for directly connecting infusion channels through a flexible hollow conduit connected at one end to a freely moving and rotating animal for experimental purposes. The infusion channels can include any combination of fluid lines, electrical wires, data cables, fiber optic or other flexible lines. The other end of the flexible hollow conduit is preferably connected to a stationary base section. The experimental animal is preferably positioned in a cage.

A fundamental principle underlying the present invention relates to the use of a hollow flexible conduit, in the form of a "question mark" structure, to permit the rotation of the top end of the hollow flexible conduit while the bottom end of the hollow flexible conduit is fixed or otherwise rigidly attached.

U.S. Pat. No. 3,586,413 ("Adams") discloses such a hollow flexible tube, in "question mark" configuration, so that a top end of the flexible tube is rotatable while the bottom end is fixed. This feature can be employed to connect terminals or catheters to an animal on a rotating platform. More specifically, Adams discloses a rotating platform that is supported above a stationary support by a rotating support. The platform and the rotating support are driven about their respective axes in the same relative direction at a speeds that bear a fixed ratio to each other, preferably, two-to-one. In this configuration, a flexible conductor guide can be provided so that a cable positioned therein can be connected at one end to a terminal on the rotating platform and, at the other end, to a fixed terminal.

The Adams disclosure is best understood with reference to schematic diagrams disclosed in Adams and shown in FIG. 1. In these schematic diagrams, a first conductor 80 is shown connected between a white terminal 81 on a rotating platform 82 and a similar white terminal 83 on a stationary surface 84. A second conductor 86 is connected between a black terminal 87 on the rotating platform 82 and a black terminal 88 on the stationary surface 84. The arrow 90 indicates the direction of rotation of the platform 82 and the relative positions of the white terminal 81 and the black terminal 87 and of the orientation of the terminals on the platform to the corresponding terminals in the stationary surface 84. As shown in these schematic diagrams, the conductors, 80 and 86, are subjected to flexure or bending as they travel about the axis 89 but they are not twisted about their axis or entangled even though the rotating platform completes more than one rotation.

Therefore, this "question mark" connection of a hollow flexible conduit or tube permits the advantageous connection of electrical, fluid or other conductor channels to a device or an animal on a platform without the necessity for additional devices such as fluid swivels or electrical commutators. The animal can rotate without entangling the channels in the hollow flexible conduit.

By itself, however, this simple configuration is not suitable for use with relatively small laboratory animals, such as rats, mice, or even guinea pigs. The small laboratory animals are not able to generate the required twist to move the flexible hollow conduit without creating an external impediment to the normal movements of the animal. The external impediment serves to inhibit the normal movements of the animal and, hence, thwarts a central purpose of laboratory experiments which seek to monitor the normal reactions of laboratory animals in a controlled environment. Accordingly, the present invention provides a tether and infusion system that is suitable for use even by smaller animals.

Figure 1A:
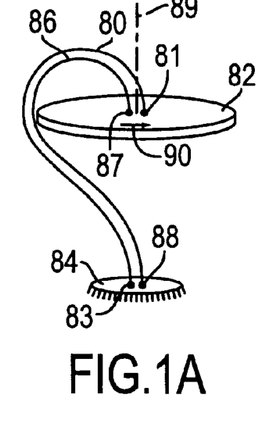
FIG. 1 is a schematic diagram of a rotating platform showing successive positions of flexible conductors connected thereto.
Figure 1B:
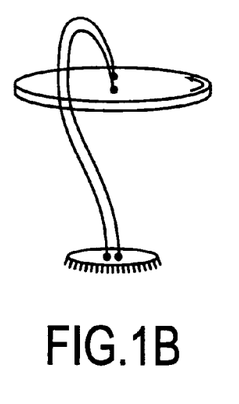
Figure 1C:
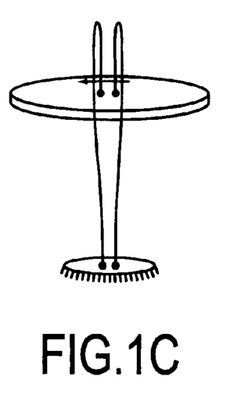
Figure 1D:
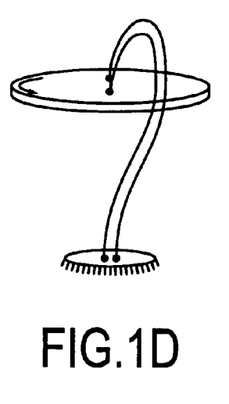
Figure 1E:
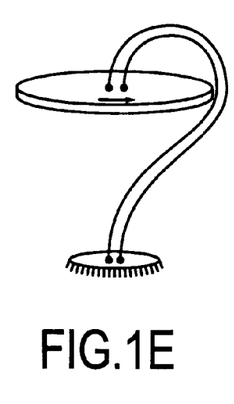
Figure 1F:
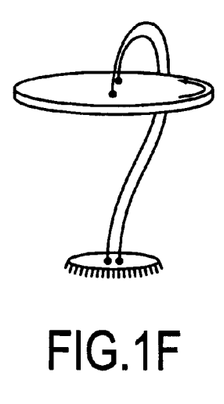
Figure 1G:
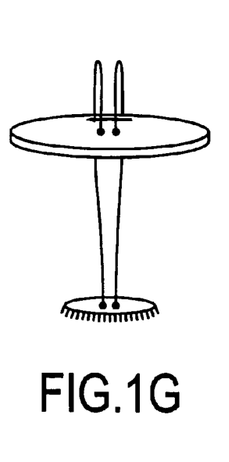
Figure 1H:
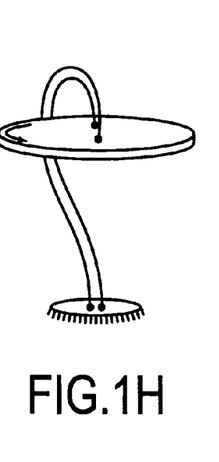
Figure 1I:
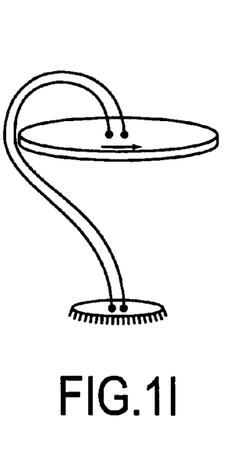
Figure 2:
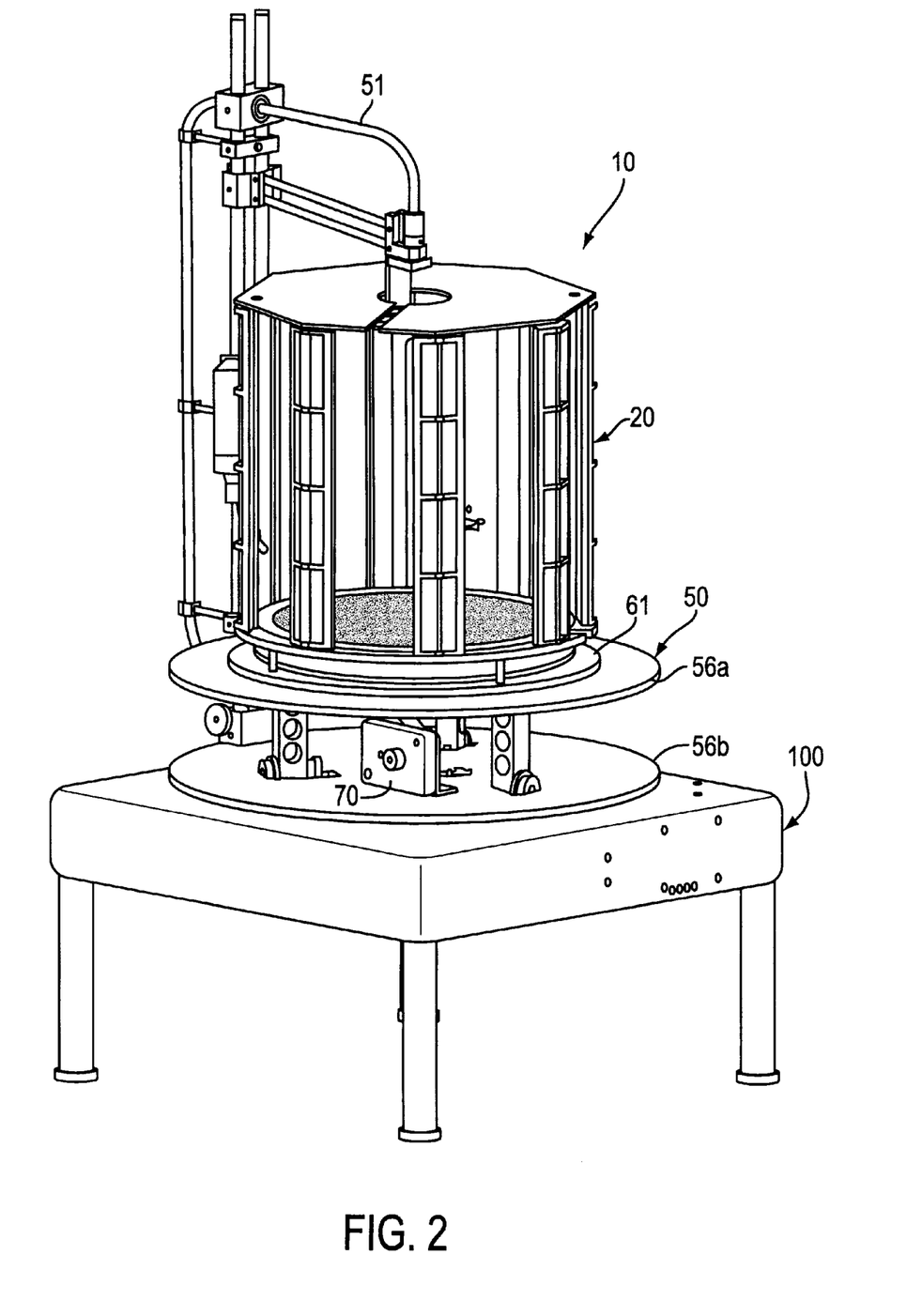
FIG. 2 shows a perspective view of a preferred embodiment of the tether and infusion system.
Figure 3:
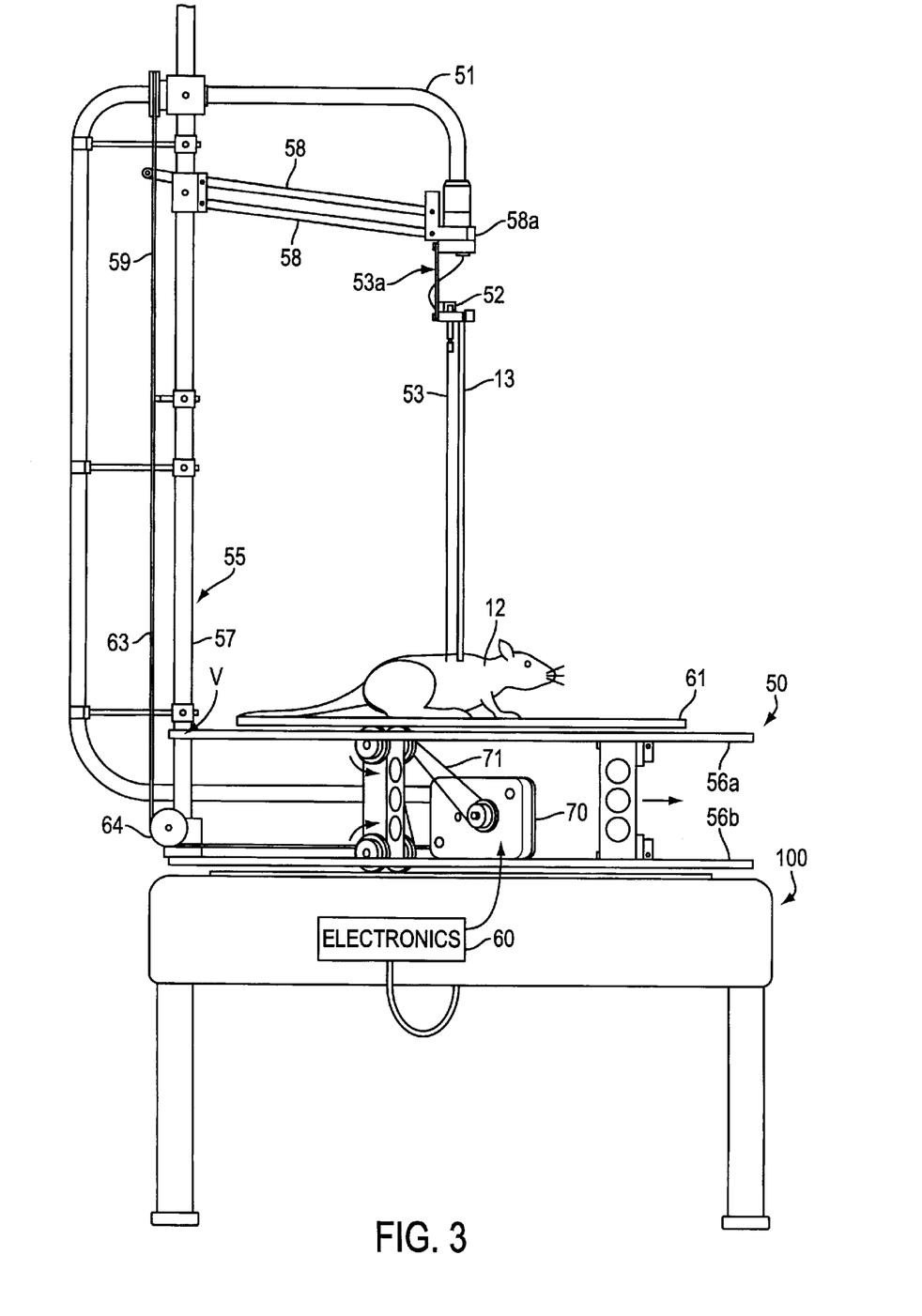
FIG. 3 is a side view of the tether and infusion system showing the moving and base sections.

FIG. 2 shows a perspective view of a preferred embodiment of the tether infusion system 10 provided by the present invention. The system 10 includes a cage section 20 mounted on a moving section 50. Both the cage section 20 and the moving section 50 are mounted on a stationary base section 100. The system 10 also includes a flexible conduit 51, shaped roughly in the form of a "question mark," that is rigidly attached at its base to the base section 100 and is connected to an animal 12 through a tether 13 at the other end as best seen in FIG. 3. FIG. 3 is a side view of the tether and infusion system 10 with the cage section 100 removed so that the base section 100 and the moving section 50 and their components are seen more clearly.

The operation of the tether and infusion system 10 can be best understood with reference to FIG. 3. As the animal 12, such as a rat or a mouse, turns inside the cage section 50 (shown in FIG. 2), a sense wire 53 connected to the animal 12 moves causing a motion or a torque sensor 52 to generate a motion detected signal which is transmitted to feedback electronics 60 provided at the base 100 of the system 10. In a preferred embodiment, the motion or torque sensor 52 includes a bar magnet that is moved by the sense wire 53 to generate the motion detected signal which is transmitted to the feedback electronics 60 provided in the base section 100. The motion detected signal is preferably transmitted by an electric wire that is passed through the conduit 51 to the feedback electronics 60 provided in the base section 100.

In an alternative embodiment, the sense wire 53 can be connected to a head of the animal 12. Therefore, the motion or torque sensor 52 generates a motion detected signal which is representative of a head motion of the animal 12. Therefore, the present invention contemplates that this alternative embodiment can be used to record and study the head motion of the animal 12 and thereby derive finer information regarding head behavior. For example, a pulse can be generated for each change in head direction. This feature is useful in determining, for example, changes in behavior with drug dosage.

In response to the motion detected signal from the motion or torque sensor 52, the feedback electronics 60 generates a signal which activates a motor 70 that is provided in the moving section 50 of the system 10. The motor 70 rotates the entire moving section 50 so that a part of the moving section 50, a tether assembly 55 moves in the same direction as the animal 12. The tether assembly 55 includes a vertical support rod 57 and two rotatable plates 56a and 56b. One end of the vertical support rod 57 is connected to the two rotatable support plates 56a and 56b while the other end of the vertical support rod 57 has a horizontal lever arm 58 that extends inwards towards the center of the cage section 20.

In a preferred embodiment, the vertical support shaft 57 is connected to the edges of circular or oval rotatable support plates 56a and 56b so that the rotatable support plates 56a and 56b are driven by the motor 70 to rotate about a generally vertical central axis. As the rotatable support plates 56a and 56b rotate, the vertical support rod 57 of the tether assembly 55 traces a circular path as it is connected at a periphery of the rotatable support plates 56a and 56b.

The horizontal lever arm 58 extends inwards towards the center of the cage section 20 and provides an attachment assembly 58a for the motion or torque sensor 52 and the tether 13. An angular displacement sensor 53a is provided between the motion sensor 52 and the attachment assembly end 58a of the vertical lever arm 58 so that angular error is minimized. A counter balance spring support 59 is provided to the tether assembly 55 supporting the hollow conduit 51 so that the conduit 51 has some range of vertical displacement that can compensate for any vertical motion of the animal 12.

The moving section 50 of the system 10 also includes a counter-rotating plate 61 that rotates in an opposite direction to that of the tether assembly 55. As the tether assembly 55 rotates in the direction of motion of the animal 12, the counter-rotation plate 61 is rotated in a direction that is opposite to the direction of rotation of the tether assembly 55. That is, the counter-rotation plate 61 is rotated in a direction that is opposite to the direction of rotation of the two rotatable plates 56a and 56b and the angular speed of rotation is the same. Consequently, the counter-rotation plate 61 remains stationary as it is rotated to compensate for the rotation of the tether assembly 55 on which it is mounted. Therefore, as the tether assembly 55 is rotated in one direction, the counter-rotation plate is rotated, at the same speed, in an opposite direction with the result that the counter-rotation plate 61 remains stationary relative to the base section 100.

The cage section 20 is connected to the counter-rotating plate 61. Since the counter rotation plate 61 remains stationary relative to the base section 100 even when the tether assembly 55 rotates, the cage section 20 remains stationary relative to the base section 100 when the tether assembly rotates or moves to follow the motion of the animal 12. Therefore, the cage section 20 remains stationary even as the tether assembly 55 rotates in response to a detected motion of the animal 12, and provides the laboratory animal 12 with a stable sensory environment that does not change when the animal 12 moves within the cage section 20.

It should be understood that the cage section 20 is provided in a preferred embodiment. In alternative embodiments, the animal could also be placed on a platform that is kept stationary using the principle described herein. That is, the platform could be rotated in a direction opposite to that of the tether assembly so that the platform is kept stationary as a tether assembly is rotated.

Furthermore, it should also be understood that the compensatory motion provided to the platform does not have to be rotation. For example, if a tether assembly is only translated in one or two directions, the compensatory motion supplied to the platform can be a translation motion that is opposite in direction to the motion of the tether assembly or of the support structure on which the tether assembly and the platform are mounted.

In the preferred embodiments, the opposite rotation of the counter-rotation plate 61 and the rotatable plates 56a and 56b can be provided by suitable mechanical or electromechanical configurations such as planetary gear systems or other mechanical transmission system that is within the ability of one skilled in the art.

Figure 4:
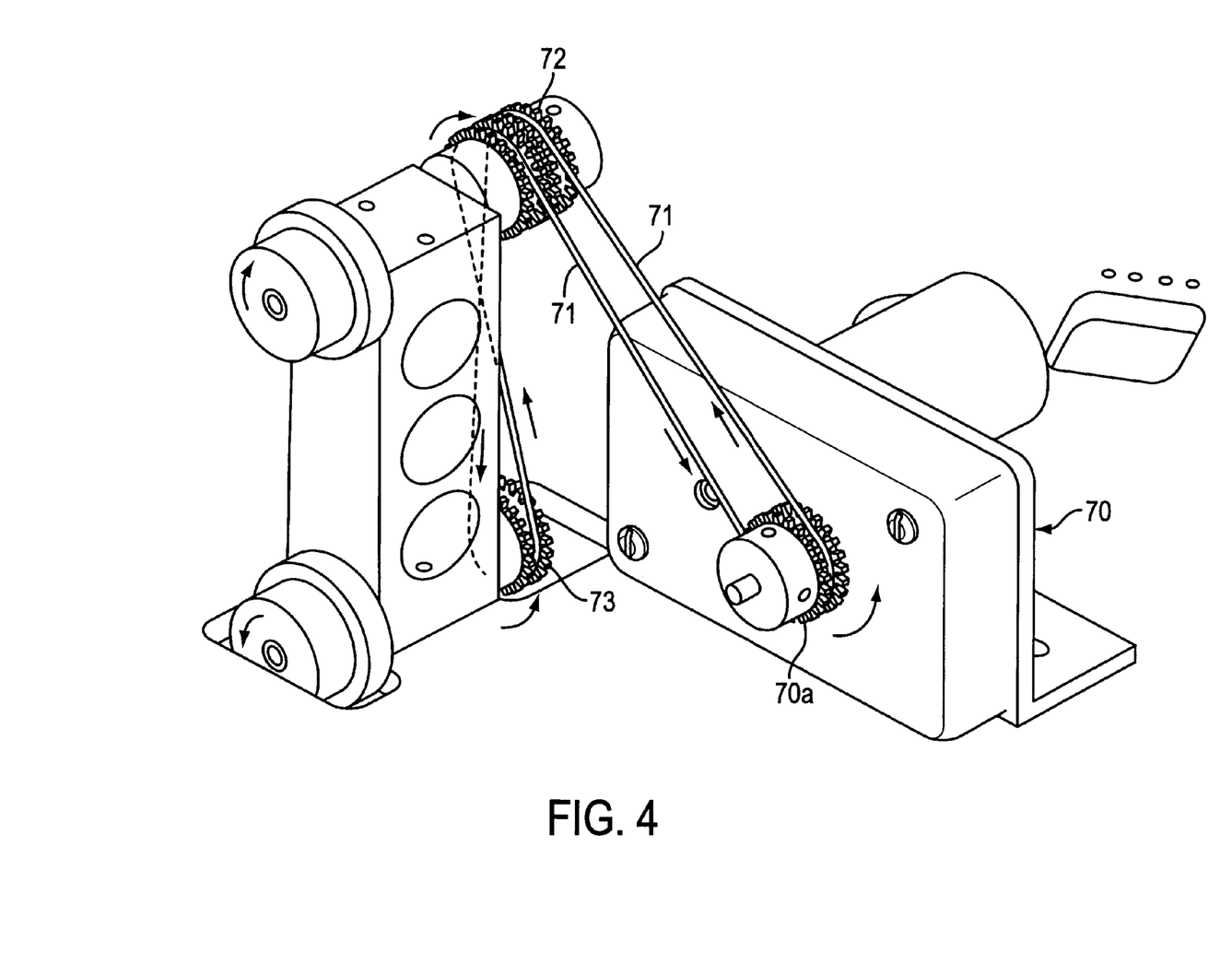
FIG. 4 is a perspective view showing a preferred embodiment of a drive system for the moving section.

A preferred embodiment of the drive system is the capstan drive system shown in FIG. 4. The drive system includes a motor 70 which drives a belt 71 by a motor drive shaft 70a. The belt 71 is looped around a first drive shaft 72 and a second drive shaft 73 in such a manner that the first drive shaft 72 and the second drive shaft 73 rotate in opposite directions. Furthermore, since both the first drive shaft 72 and the second drive shaft 73 are driven by the same belt they are driven at the same speeds, with only the direction of rotation being opposite. Thus, one of the first or second drive shafts, 72 and 73, can be used to drive the rotatable plates 56a and 56b while the other of the drive shafts, 72 and 73, can be used to drive the counter-rotation plate 61. In this manner, the drive system drives the counter-rotation plate 61 and the rotatable plates 56a and 56b of the tether assembly 55 in opposite directions but at the same speed. In this way, the counter rotation plate 61 stays stationary relative to the base section 100 and the cage section 20 positioned thereon also remains stationary relative to the base section 100 even when the tether assembly 55 is rotating in a direction responsive to a detected motion of the animal 12.

Therefore, the system 10 provides a configuration in which the tether assembly 55 moves in a direction of motion of the animal 12 to lessen the torque on the animal 12. At the same time, the cage section 20 remains stationary so that the monitored animal 12 experiences a sensory environment that is as close to normal as possible. The environment of the animal 12 does not change as the animal 12 attempts to move. Nor is there any treadmill like motion at the base of the cage section 20 that creates an unnatural environment for the animal. Furthermore, the tether assembly 55 tracks the motion of the animal 12 and thereby reduces the torque on the animal 12.

Furthermore, the rotation of the tether assembly 55 to track the motion of the animal 12 significantly reduces the torque on the animal so that it becomes feasible to provide multiple infusion channels to the animal including multiple fluid channels. As discussed earlier, multiple fluid channels significantly increase the torque on an animal. Therefore, the power assist mechanism by which the tether assembly responds to the movement of the animal reduces the torque on the animal and permits the provision of multiple fluid channels to an awake laboratory animal. Accordingly, this device could be used for brain microdialysis of even relatively small animals, such as mice, as the up to four or more fluid channels can be provided to exchange fluids with a test animal 12.

The fluid channels 12 can be connected to the animals by using catheters or other similar connection devices that is within the ability of one skilled in the art. Likewise, electric wires can also be connected to an animal by using suitable terminals that is within the ability of one skilled in the art.

As best seen in FIG. 2, the cage section 20 is designed to contain the experimental animal 12. The cage section 20 is preferably mounted on the counter rotation plate 61. In operation, the cage section 20 remains stationary, relative to the base section 100, because it is positioned on the counter-rotation plate 61 which remain stationary, relative to the base section 100, because it is driven in an opposite direction to the direction of rotation of the tether assembly 55 and its rotatable plates 56 and 56n. The cage section 20 is equipped with feeders, water supply, and other operant or animal conditioning devices.

For example, the cage section can be provided with eight slide-in panels to form the outside of the cage. One of the slide-in panels can accommodate a water bottle, while another can contain a pellet feeder. The bottom of the cage is preferably perforated so that urine and feces are collected by a removable tray positioned under the cage. The bottom of the cage can also be removable to facilitate cleaning.

In addition, the cage section 20 can also be provided with bar press levers, lights, and other devices that can be provided using the slide-in panels. Direct electrical coupling to these devices is not possible because of using the "question mark" shaped conduit 51 structure. Therefore, control of these devices can be provided by using bi-directional infrared coupling of signals from the base section 100 to the cage section 20. The cage section 20 functions can be provided by a battery powered microprocessor based transmitted/receiver and control package mounted on the outside of one of the slide-in panels. A similar unit can be mounted on the base unit 100 which is connected to a main power source. Interface cables from the tether and infusion system 10 can be made compatible with commercial monitoring/conditioning systems, such as, for example, the Habitest System, provided by Coulbourn instruments.

FIG. 2 also shows, inter alia, a perspective view of the stationary base section 100. Both the cage section 20 and the moving section 50 are supported by the base section 100. The base section 100 also contains the feedback control electronics 60, as seen in FIG. 3. The base section 100 also provides access to the infusion channels, contained within the conduit 51, to externally located pumps, amplifiers, and other similar equipment that may be necessary for the conduct of the animal experiments.

The feedback electronics 60 that responds to an input signal indicating a motion of the animal so that it generates a signal to activate and control a motor 70 that drives the tether assembly 55 can be easily designed by one skilled in the art. One example of such a motor control card is the family of motor speed control cards that are sold by Instech Laboratories of Plymouth Meeting, Pa. ("Instech Laboratories"). This commercially available family of motor speed control cards, model numbers MC500, MC50, and MC2000 provide precise bi-directional speed control. These cards control a motor to provide a constant speed over a wide range of torques.

Figure 5:
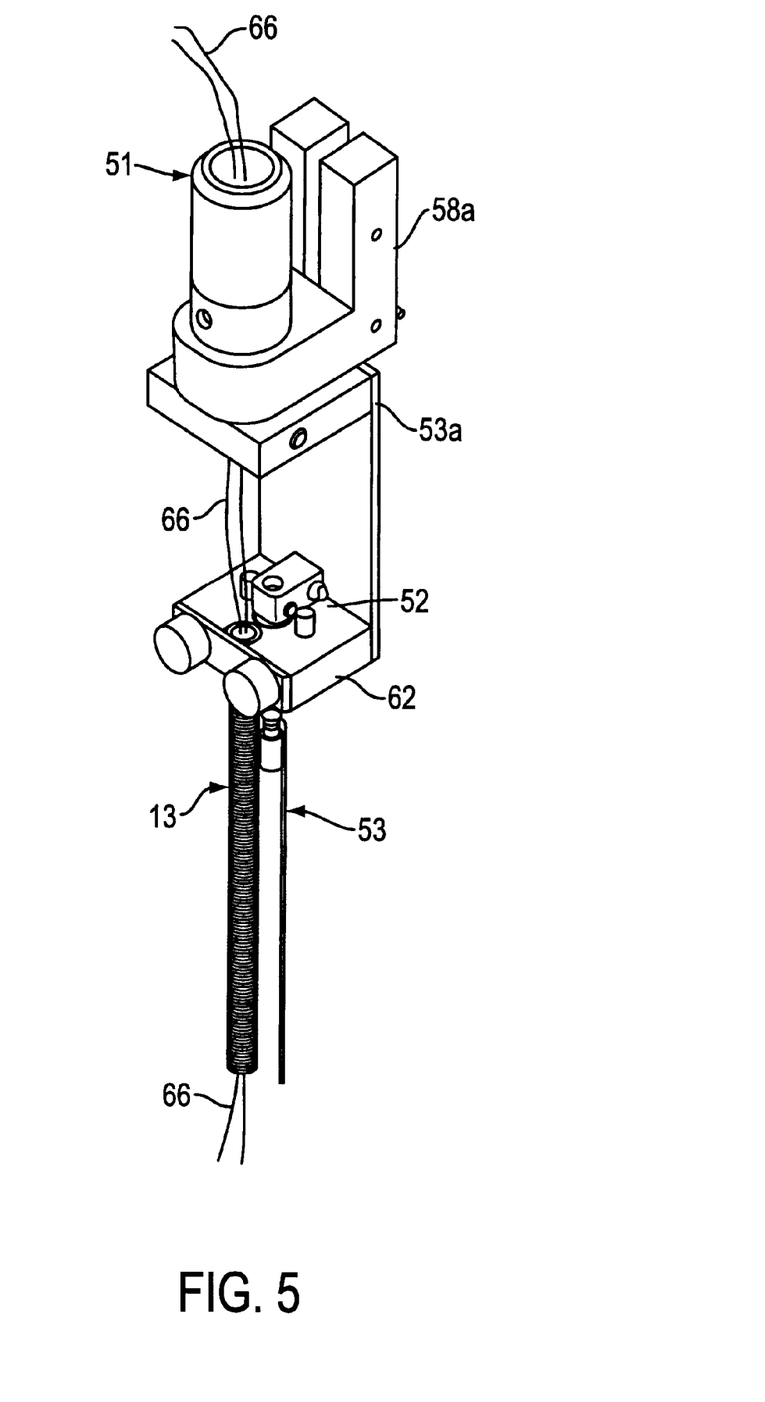
FIG. 5 is a perspective view showing the end assembly of the tether assembly with the torque sensor.

FIG. 5 is a perspective view showing a preferred embodiment of the end assembly 58a of the tether assembly 55 and components of the torque or motion sensor 52. A sense wire 53 is connected to the animal (not shown in FIG. 5) at or close to the point of attachment of the tether 13 to the animal. The sense wire 53 and the tether 13 run to a small block 62 that has a motion or torque sensor 52 positioned thereon. The tether 13 contains the infusion channels or lines 66 that connect to the animal 12. Towards the other end, the channels 66 pass through the conduit 51 to the point of attachment of the conduit 51 at the base section 100 where the channels can interface with pumps, amplifiers, and other devices that are required for the conduct of the animal experiments.

Figure 6:
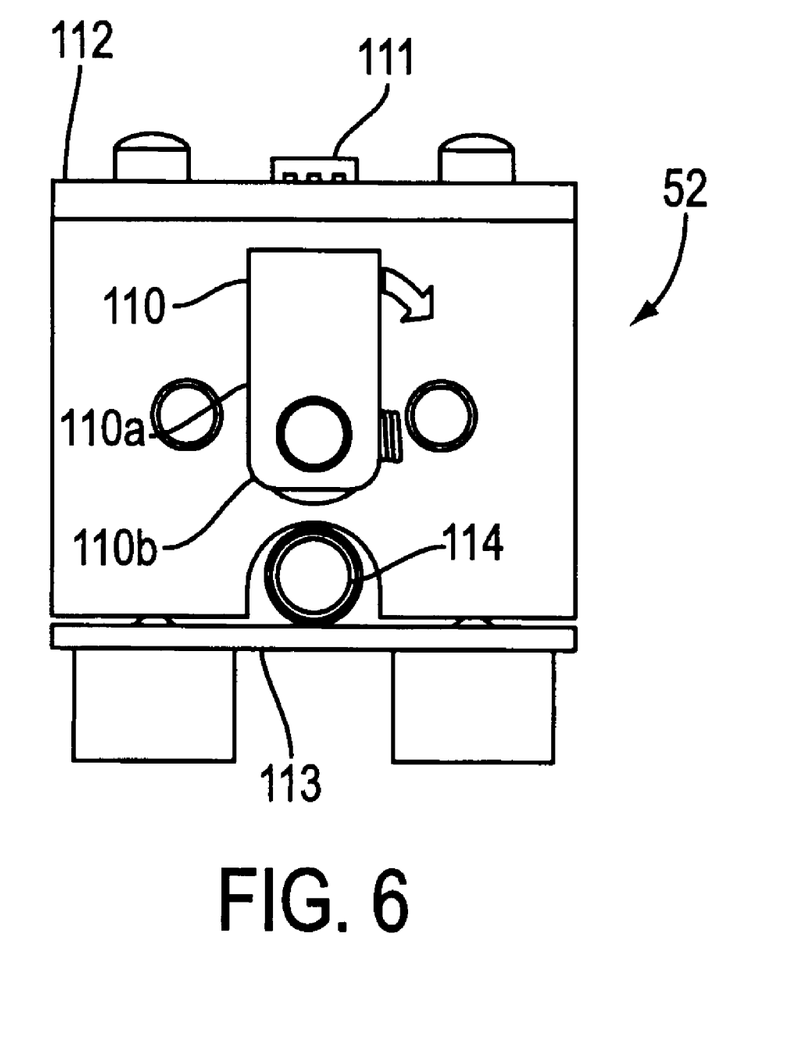
FIG. 6 is a top view of an embodiment of a torque or motion sensor.

FIG. 6 shows top view of a preferred embodiment of the torque or motion sensor 52. As seen in FIGS, 5 and 6, the motion or torque sensor 52 includes a small magnet 110 mounted perpendicular to axis of the sense wire 53 and offset so that it can swing in a small arc. A bi-directional Hall sensor 111 mounted on a PCB 112 yields a signal proportional to the angular deviation of the animal relative to the present conduit 51 position. Electrical lines from the Hall sensor 111 enter the conduit 51 at this point and exit at the base for connection to the feedback electronics 60 (as shown in FIG. 3). This signal is conditioned and used to drive the motor 70 and, thereby control the tether angle, either backward or forward, to align the tether 13 to the animal 12. FIG. 5 also shows that bar magnet 110 includes swinging magnet arm 110a that has a pivot 110b that is attached to the sense wire 53 connected to the animal. FIG. 5 also shows a tether clamping plate 113 and the tether 53 to the animal (no lines or channels are shown).

The Hall sensor section 111 can be made by one skilled in the art and one such device is made for commercial use by Instech Laboratories. The signals from the sensor section are used to control, in a preferred embodiment, a 2 amp, bi-directional motor speed controller similar to the Model MC2000 motor commercially sold by Instech Laboratories. Commutation of the motor leads is required to couple the drive signal from the feedback electronic 60 to the motor 70 mounted in the moving section 50.

As shown in FIG. 3, the conduit 51 is also rotationally driven ("rolling") at the top of the system 10 by using a drive, such as a urethane belting 63. The belt is wrapped around a pulley groove 64 attached to the vertical support rod 57. As the tether assembly 55 rotates, this belt causes the conduit 51 to rotate at an angular velocity that is twice that of the angular rotation velocity of the tether assembly 55. This mechanical assistance is provided to prevent windup and release of the conduit 51, as the tether assembly 55 rotates and thereby prevent a jerky motion of the tether assembly 55. The channels or lines contained within the conduit 51 roll over each other but do not twist.

In an alternative embodiment, the present invention also provides that in the event that the sense wire 53 somehow becomes disconnected and the system runs continuously in an open loop based on a position of the magnet 52, the signal from the torque sensor 52 is differentiated. Based on the differentiated signal from the torque sensor 52, if no activity is detected for a fixed interval of time, the drive (i.e. the motor 70) is shut down to thereby prevent the system running continuously in the open loop condition.

Figure 7:
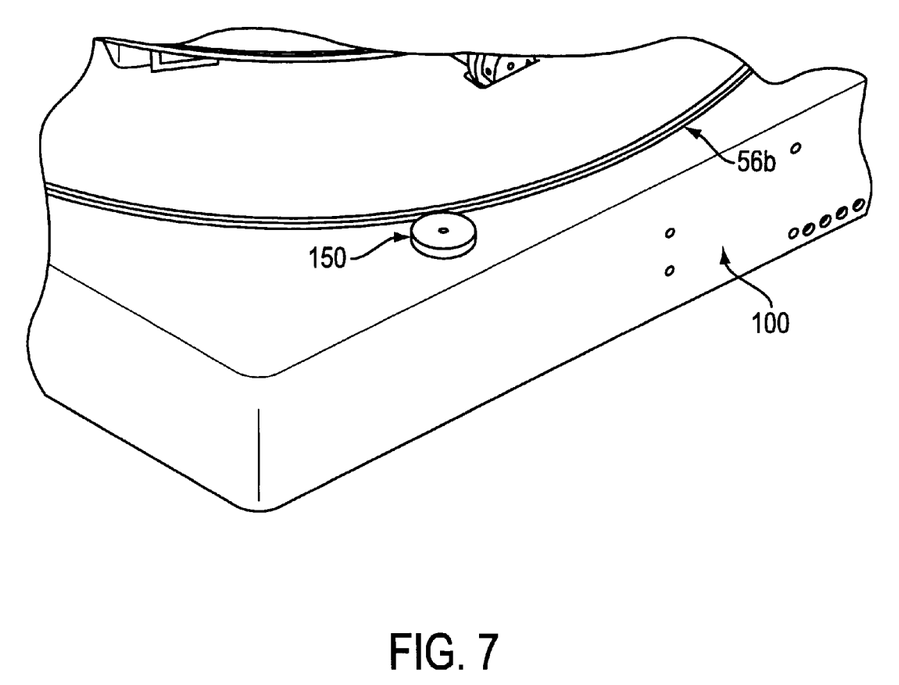
FIG. 7 is a partial view of the moving and base sections showing a rim driven encoder component.

FIG. 7 is a partial view of the base section 100 and the lower plate 56b of the moving section 50 that shows the use of a rim driven encoder 150 to detect a rotational activity of the animal 12. A component of the rim driven encoder 150 is pressed against the bottom rotating plate 56b. The resulting pulses are separated into two channels, based on direction, by a quadrature detector and made available for external monitoring. This allows an experimenter to accumulate the clockwise and counter clockwise rotations with an accuracy of better than 1/100 of a full revolution of the animal. The use of such a rim driven encoder and a quadrature detector is within the abilities of one skilled in the art and several such rim driven encoders are commercially available. Details of designing and building a suitable quadrature detector are provided in, for example, the Hewlett Packard website at a URL of http://www.hp.com/HP-COMP/motion/hctl2000.html which includes a downloadable 18 page technical data document in PDF format, the disclosure of which is incorporated herein, in its entirety.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A tether and infusion system for a laboratory animal comprising:
    a platform suitable for carrying the laboratory animal;
    a tether assembly, including a flexible conduit containing a plurality of infusion channels, for tethering the animal on the platform;
    a torque sensor for detecting a motion of the animal on the platform; and
    a drive means that drives the flexible conduit in response to a detected motion of the animal, thereby reducing the torque on the animal.

2. The tether and infusion system according to claim 1, wherein the plurality of infusion channels include one of electric wire, fluid channel, and an optical fiber.

3. The tether and infusion system according to claim 1, wherein the plurality of infusion channels include an electric wire and a fluid channel.

4. The tether and infusion system according to claim 1, wherein the plurality of infusion channels include a fluid channel and an optical fiber.

5. The tether and infusion system according to claim 1, wherein the plurality of infusion channels include an electric wire and an optical fiber.

6. The tether and infusion system according to claim 1, wherein the tether and infusion system further comprises feedback electronics connected to the torque sensor and to the drive means, wherein the feedback electronics responds to a signal from the torque sensor to activate the drive means to drive the flexible conduit in response to the detected motion of the animal.

7. The tether and infusion system according to claim 1, wherein the platform is driven in an opposite direction to a driven direction of the flexible conduit so that the platform appears to remain stationary when the flexible conduit is driven in response to a detected motion of the animal.

8. The tether and infusion system according to claim 7, further comprising a cage section mounted on the platform, such that the cage section remains stationary when the flexible conduit is driven in response to a detected motion of the animal.

9. The tether and infusion system according to claim 1, wherein the tether assembly includes a torque sense wire connected to the animal and the torque sensor uses the torque sense wire to detect the motion of the animal.

10. The tether and infusion system according to claim 9, wherein the torque sense wire is connected to a head of the animal and the torque sensor detects a head motion of the animal.

11. The tether and infusion system according to claim 1, further comprising
    a rotatable moving section on which the platform is positioned;
    a rim encoder, connected to the rotatable moving section, that detects a motion of the animal by detecting a rotation of the rotatable moving section.

12. The tether and infusion system according to claim 1, further including a means for differentiating a signal from the torque sensor so as to shut down the drive means if no activity is sensed for a fixed interval of time.

13. The tether and infusion system according to claim 12, wherein the fixed interval of time is 15 seconds.

14. A method for tethering and infusing an animal on a movable platform, comprising the steps of:
    connecting a flexible conduit comprising a plurality of infusion channels to the animal;
    providing a torque or motion sensor to detect a motion of the animal; and
    driving the flexible conduit, in response to the detected motion, to reduce the torque on the animal.

15. The method according to claim 14, wherein the plurality of infusion channels includes one of a electric wire, a fluid channel, and an optical fiber.

16. The method according to claim 14, wherein the step of driving the flexible conduit includes driving the flexible conduit in a direction of the motion of the animal.

17. The method according to claim 14, further comprising the step of:
    driving the movable platform in a direction opposite to a driven direction of the flexible conduit so that the platform appears stationary to the animal.

* * * * *